US012190814B2

(12) United States Patent
Byun et al.

(10) Patent No.: US 12,190,814 B2
(45) Date of Patent: Jan. 7, 2025

(54) PIXEL, DISPLAY DEVICE INCLUDING THE SAME, AND DRIVING METHOD THEREOF

(71) Applicant: Samsung Display Co., LTD., Yongin-si (KR)

(72) Inventors: Min Woo Byun, Yongin-si (KR); Chae Han Hyun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/466,973

(22) Filed: Sep. 14, 2023

(65) Prior Publication Data

US 2024/0265868 A1 Aug. 8, 2024

(30) Foreign Application Priority Data

Feb. 2, 2023 (KR) ........................ 10-2023-0014475

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0223* (2013.01); *G09G 2320/0233* (2013.01)

(58) Field of Classification Search
CPC ......... G09G 3/3233; G09G 2300/0819; G09G 2300/0852; G09G 2300/0861; G09G 2310/08; G09G 2320/0223; G09G 2320/0233
See application file for complete search history.

(56) References Cited

U.S. PATENT DOCUMENTS 11,170,719 B1 11/2021 Lu et al.
2016/0232853 A1* 8/2016 Hwang ................ G09G 3/3233

FOREIGN PATENT DOCUMENTS

KR 10-2393418 5/2022
WO 2018/182357 10/2018
WO WO-2020103083 A1 * 5/2020 ............... G09G 3/32

* cited by examiner

*Primary Examiner* — Stacy Khoo
(74) *Attorney, Agent, or Firm* — KILE PARK REED & HOUTTEMAN PLLC

(57) ABSTRACT

A pixel includes a light emitting element, a driving transistor having an electrode electrically connected to an anode electrode of the light emitting element and another electrode electrically connected to a first power source, and controlling a current flowing from the first power source to a second power source, a first transistor electrically connected between a gate electrode of the driving transistor and a reference power source, a second transistor electrically connected between the anode electrode and an initialization power source, a third transistor electrically connected between the gate electrode and a data line, and a fourth transistor and a fifth transistor electrically connected in parallel between the first power source and the another electrode. The fourth transistor compensates a threshold voltage of the driving transistor during a compensation period, and the fifth transistor is turned so that the current is controlled during an emission period.

18 Claims, 9 Drawing Sheets

PIXEL, DISPLAY DEVICE INCLUDING THE SAME, AND DRIVING METHOD THEREOF

CROSS REFERENCE TO RELATED APPLICATION(S)

This application claims priority to and benefits of Korean Patent Application No. 10-2023-0014475 under 35 U.S.C. § 119, filed on Feb. 2, 2023, in the Korean Intellectual Property Office (KIPO), the entire contents of which are incorporated herein by reference.

BACKGROUND

1. Technical Field

The disclosure relates to a pixel, a display device including the same, and a driving method thereof.

2. Description of the Related Art

As information technology develops, the importance of a display device, which is a connection medium between a user and information, has been emphasized. In response to this, the use of display devices such as a liquid crystal display device, an organic light emitting display device, and the like has been increasing.

Light emitted from the display device may be controlled by an emission control signal applied to a pixel. A voltage drop may occur at a source node of a driving transistor included in the pixel due to kick-back at a falling edge of the emission control signal. Accordingly, unintended stains such as mura or the like may occur on a display panel.

SUMMARY

The disclosure provides a pixel that improves a mura phenomenon that may occur in a display panel due to kick-back at a falling edge of an emission control signal, a display device including the same, and a driving method thereof.

A pixel according to an embodiment of the disclosure may include a light emitting element, a driving transistor having an electrode electrically connected to an anode electrode of the light emitting element and another electrode electrically connected to a first power source, and controlling a current flowing from the first power source to a second power source through the light emitting element, a first transistor electrically connected between a gate electrode of the driving transistor and a reference power source, a second transistor electrically connected between the anode electrode of the light emitting element and an initialization power source, a third transistor electrically connected between the gate electrode of the driving transistor and a data line, and a fourth transistor and a fifth transistor electrically connected in parallel between the first power source and the another electrode of the driving transistor. The fourth transistor may compensate a threshold voltage of the driving transistor by electrically connecting the another electrode of the driving transistor to the first power source during a compensation period, and the fifth transistor may be turned so that the current flowing through the light emitting element is controlled according to a control of the driving transistor during an emission period of the light emitting element.

In an embodiment, the pixel may further include a first capacitor electrically connected between the gate electrode of the driving transistor and the anode electrode of the light emitting element, and a second capacitor electrically connected between the first power source and the anode electrode of the light emitting element.

In an embodiment, the first transistor may be turned on in a first initialization period to initialize the gate electrode of the driving transistor, the second transistor may be turned on in the first initialization period to initialize the anode electrode of the light emitting element, and the third transistor may be turned on during a data writing period to apply a data voltage to the gate electrode of the driving transistor.

In an embodiment, the second transistor may be turned on during a second initialization period between the data writing period and the emission period to initialize the anode electrode of the light emitting element.

In an embodiment, the light emitting element may repeat the emission period and a non-emission period other than the emission period in each of a plurality of emission cycles included in one frame period, each of the plurality of emission cycles may include the emission period, the fifth transistor may be turned on in the emission period included in each of the plurality of emission cycles, and the fourth transistor may be turned on in a first emission cycle among the plurality of emission cycles and turned off in ones of the plurality of emission cycles other than the first emission cycle.

In an embodiment, the light emitting element may repeat the emission period and a non-emission period other than in the emission period in each of a plurality of emission cycles included in one frame period, each of the plurality of emission cycles may include the emission period, and the first transistor and the third transistor may be turned off in each one of the plurality of emission cycles other than a first emission cycle.

A display device according to an embodiment of the disclosure may include a pixel, a compensation driver compensating a threshold voltage of a driving transistor included in the pixel by providing a compensation control signal to the pixel, and an emission driver controlling an operation of emitting light from a light emitting element included in the pixel by providing an emission control signal to the pixel. The pixel may include the driving transistor having an electrode electrically connected to an anode electrode of the light emitting element and another electrode electrically connected to a first power source and controlling a current flowing from the first power source to a second power source through the light emitting element, a first transistor electrically connected between a gate electrode of the driving transistor and a reference power source, a second transistor electrically connected between the anode electrode of the light emitting element and an initialization power source, a third transistor electrically connected between the gate electrode of the driving transistor and a data line, and a fourth transistor and a fifth transistor electrically connected in parallel between the another electrode of the driving transistor and the first power source. The compensation driver may provide the compensation control signal to a gate electrode of the fourth transistor among a plurality of emission control transistors in a compensation period, and the emission driver may provide the emission control signal to a gate electrode of the fifth transistor among the plurality of emission control transistors in an emission period of the light emitting element.

In an embodiment, the pixel may further include a first capacitor electrically connected between the gate electrode of the driving transistor and the anode electrode of the light emitting element, and a second capacitor electrically connected between the first power source and the anode electrode of the light emitting element.

In an embodiment, the display device may further include a first initialization driver providing a first initialization signal to the pixel to initialize the gate electrode of the driving transistor, a second initialization driver providing a second initialization signal to the pixel to initialize the anode electrode of the light emitting element, a data driver applying a data voltage to the pixel, and a scan driver providing a scan signal to the pixel so that the data voltage is applied to the pixel at a time point. The first initialization driver may provide the first initialization signal to a gate electrode of the first transistor in a first initialization period, the second initialization driver may provide the second initialization signal to a gate electrode of the second transistor in the first initialization period, and the scan driver may provide the scan signal to a gate electrode of the third transistor in a data writing period in which the data voltage is applied to the gate electrode of the driving transistor.

In an embodiment, the second initialization driver may provide the second initialization signal to the gate electrode of the second transistor in a second initialization period between the data writing period and the emission period.

In an embodiment, the light emitting element may repeat the emission period and a non-emission period other than the emission period in each of a plurality of emission cycles included in one frame period, each of the plurality of emission cycles may include the emission period, the emission driver may provide the emission control signal to the gate electrode of the fifth transistor in the emission period included in each of the plurality of emission cycles, and the compensation driver may provide the compensation control signal to the gate electrode of the fourth transistor in the compensation period included in a first emission cycle among the plurality of emission cycles.

In an embodiment, the light emitting element may repeat the emission period and an non-emission period other than the emission period in each of a plurality of emission cycles included in one frame period, each of the plurality of emission cycles may include the emission period, and the first transistor and the third transistor may be turned off in each one of the plurality of emission cycles other than a first emission cycle.

According to an embodiment of the disclosure, a driving method of a display device including a pixel including a light emitting element and a driving transistor having an electrode electrically connected to an anode electrode of the light emitting element and another electrode electrically connected to a first power source and controlling a current flowing from the first power source to a second power source through the light emitting element, may include initializing a gate electrode of the driving transistor, initializing the anode electrode of the light emitting element, compensating a threshold voltage of the driving transistor, applying a data voltage to the gate electrode of the driving transistor, and emitting light from the light emitting element. In the compensating of the threshold voltage of the driving transistor, a compensation control signal may be provided to a gate electrode of a fourth transistor among the fourth transistor and a fifth transistor electrically connected in parallel between the another electrode of the driving transistor and the first power source to compensate the threshold voltage of the driving transistor, and in the emitting of light from the light emitting element, an emission control signal may be provided to a gate electrode of the fifth transistor to control an operation of emitting light from the light emitting element.

In an embodiment, the pixel may further include a first transistor electrically connected between the gate electrode of the driving transistor and a reference power source, a second transistor electrically connected between the anode electrode of the light emitting element and an initialization power source, a third transistor electrically connected between the gate electrode of the driving transistor and a data line, a first capacitor electrically connected between the gate electrode of the driving transistor and the anode electrode of the light emitting element, and a second capacitor electrically connected between the first power source and the anode electrode of the light emitting element.

In an embodiment, the initializing of the gate electrode of the driving transistor may include providing a first initialization signal to a gate electrode of the first transistor to initialize the gate electrode of the driving transistor, the initializing of the anode electrode of the light emitting element may include providing a second initialization signal to a gate electrode of the second transistor to initialize the anode electrode of the light emitting element, and the applying of the data voltage to the gate electrode of the driving transistor may include applying a scan signal to a gate electrode of the third transistor so that the data voltage is applied to the pixel at a time point.

In an embodiment, the driving method may further include providing the second initialization signal to the gate electrode of the second transistor after the applying of the data voltage to the gate electrode of the driving transistor and before the emitting of light from the light emitting element.

In an embodiment, the light emitting element may repeat the emission period and a non-emission period other than the emission period in each of a plurality of emission cycles included in one frame period, each of the plurality of emission cycles may include the emitting of light from the light emitting element, and only a first emission cycle among the plurality of emission cycles may include the compensating of the threshold voltage of the driving transistor.

In an embodiment, each one of the plurality of emission cycles other than the first emission cycle may not include the initializing of the gate electrode of the driving transistor, the compensating of the threshold voltage of the driving transistor, and the applying of the data voltage to the gate electrode of the driving transistor.

BRIEF DESCRIPTION OF THE DRAWINGS

The accompanying drawings, which are included to provide a further understanding of the disclosure, and are incorporated in and constitute a part of this specification, illustrate embodiments of the disclosure, and, together with the description, serve to explain principles of the disclosure.

DETAILED DESCRIPTION OF THE EMBODIMENTS

Figure 1:
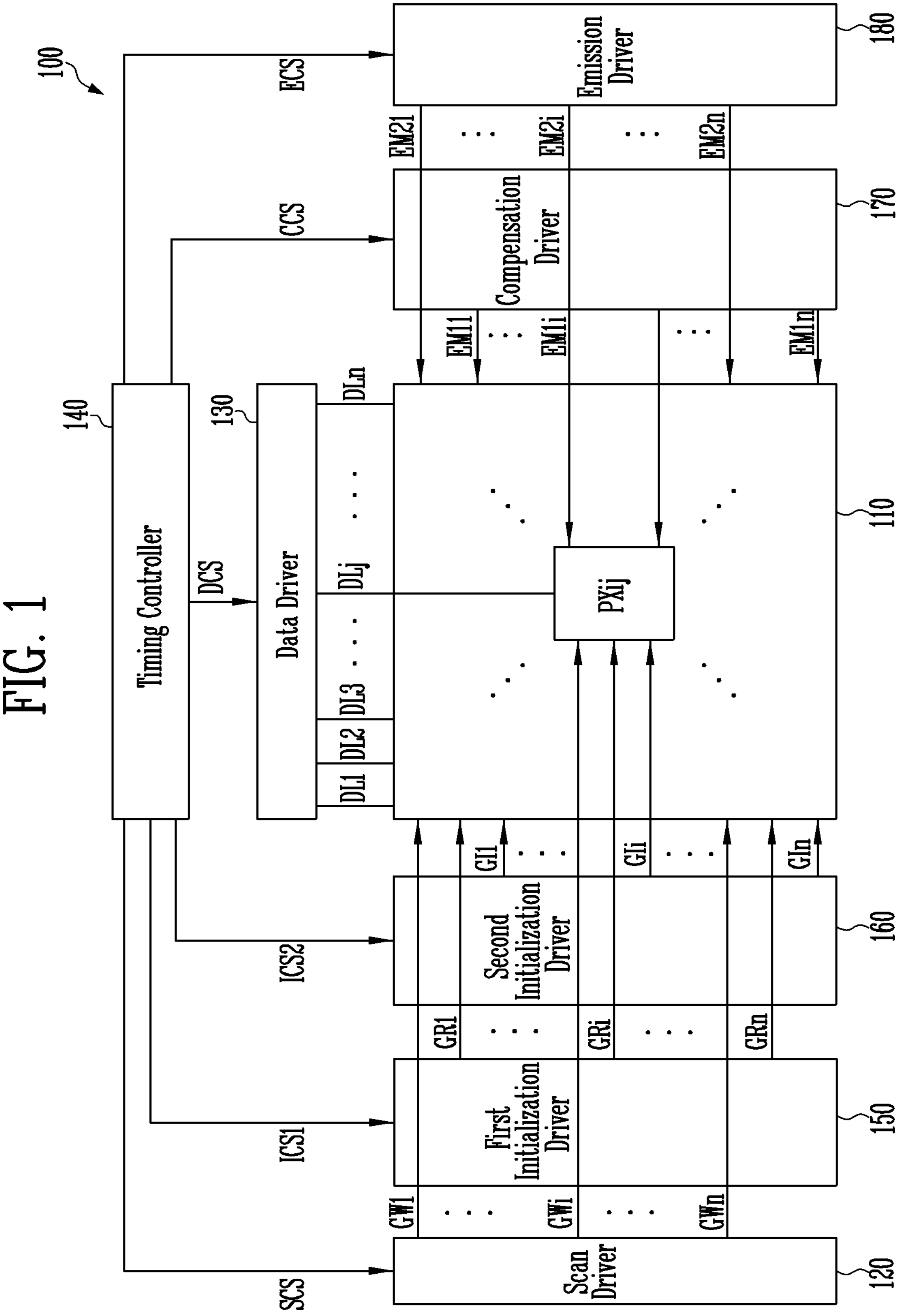
FIG. 1 is a schematic block diagram illustrating a display device according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In the description, the expression "is the same" may mean "substantially the same". That is, it may be the same enough to convince those of ordinary skill in the art to be the same. In other expressions, "substantially" may be omitted.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

When an element, such as a layer, is referred to as being "on," or "connected to," another element or layer, it may be directly on or connected to the other element or layer or intervening elements or layers may be present. To this end, the term "connected" may refer to physical, electrical, and/or fluid connection, with or without intervening elements. When a component is described herein to "connect" another component to the other component or to be "connected to" other components, the components may be connected to each other as separate elements, or the components may be integral with each other.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Also, in the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Spatially relative terms, such as "below," "under," "above," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some example embodiments may be physically separated into two or more interacting and discrete blocks, units, and/or modules without departing from the scope of the disclosure. Further, the blocks, units, and/or modules of some example embodiments may be physically combined into more complex blocks, units, and/or modules without departing from the scope of the disclosure.

Hereinafter, various embodiments of the disclosure will be described in detail with reference to the accompanying drawings so that those of ordinary skill in the art may easily implement the disclosure. The disclosure may be embodied in various different forms and is not limited to the embodiments described herein.

In order to clearly describe the disclosure, parts that are not related to the description are omitted, and the same or similar components are denoted by the same reference numerals throughout the specification. Therefore, the reference numerals described above may also be used in other drawings.

Unless otherwise specified, the illustrated embodiments are to be understood as providing example features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The size and thickness of each component shown in the drawings are arbitrarily shown for convenience of description, and thus the disclosure is not necessarily limited to those shown in the drawings. In the drawings, thicknesses may be exaggerated to clearly express the layers and regions.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic block diagram illustrating a display device according to an embodiment.

Referring to FIG. 1, a display device 100 according to an embodiment may include a pixel unit 110, a scan driver 120, a data driver 130, a timing controller 140, a first initialization driver 150, a second initialization driver 160, a compensation driver 170, and an emission driver 180.

The display device 100 may be a flat panel display device, a flexible display device, a curved display device, a foldable display device, a bendable display device, or the like. The display device 100 may be a transparent display device, a head mounted display device, a wearable display device, or the like. The display device 100 may be applied to various electronic devices such as smart phones, tablets, smart pads, TVs, monitors, and the like.

The display device 100 may be an organic light emitting display device, a liquid crystal display device, a self-light emitting display device including an inorganic light emitting element, or the like. However, the display device 100 is not limited thereto.

The pixel unit 110 may include pixels PXij positioned to be connected to multiple vertical lines, for example, data lines DL1 to DLn (where n may be a natural number) and multiple horizontal lines. Although not shown in the drawings, the pixels PXij may receive voltages from an external power source. The pixel unit 110 may receive a data voltage corresponding to an input image from the data driver 130 through the data lines DL1 to DLn. The pixel unit 110 may receive driving signals for driving multiple pixel circuits included in the pixel unit 110 from multiple drivers included in the display device 100 through the horizontal lines. Referring to FIG. 1, the drivers may be the scan driver 120, the first initialization driver 150, the second initialization driver 160, the compensation driver 170, and/or the emission driver 180.

In an embodiment, transistors included in a pixel PXij may be P-type transistors (for example, P-type oxide thin film transistors). For example, an oxide thin film transistor may be a low temperature polycrystalline oxide (LTPO) thin film transistor. However, the transistors are not limited thereto. For example, an active pattern (semiconductor layer) included in the transistors may include an inorganic semiconductor (for example, amorphous silicon or poly silicon) or an organic semiconductor. In another embodiment, at least one of the transistors included in the display device 100 and/or the pixel PXij may be replaced with an N-type transistor.

The timing controller 140 may generate multiple control signals for controlling the drivers included in the display device 100, including a data driving control signal DCS, in response to synchronization signals supplied from outside. Referring to FIG. 1, the control signals may be a scan driving control signal SCS, a data driving control signal DCS, a first initialization driving control signal ICS1, a second initialization driving control signal ICS2, a compensation driving control signal CCS, or an emission driving control signal ECS. The control signals generated by the timing controller 140 may each be supplied to corresponding drivers. For example, in FIG. 1, the data driving control signal DCS for controlling the data driver 130 may be supplied to the data driver 130. For example, a scan driving control signal SCS for controlling the scan driver 120 may be supplied to the scan driver 120. For example, a first initialization driving control signal ICS1 for controlling the first initialization driver 150 may be supplied to the first initialization driver 150. For example, a second initialization driving control signal ICS2 for controlling the second initialization driver 160 may be supplied to the second initialization driver 160. For example, a compensation driving control signal CCS for controlling the compensation driver 170 may be supplied to the compensation driver 170. For example, an emission driving control signal ECS for controlling the emission driver 180 may be supplied to the emission driver 180.

Each of the control signals supplied to the drivers may include a control start signal and clock signals. The control start signal may control a timing of a driving control signal. Referring to FIG. 1, the control start signal may be a scan signal GWi (or GW), a first initialization signal GRi (or GR), a second initialization signal GIi (or GI), a compensation control signal EM1*i* (or EM1), or an emission control signal EM2*i* (or EM2). The clock signals may be used to shift the control start signal.

The scan driver 120 may receive the scan driving control signal SCS from the timing controller 140. The scan driver 120 receiving the scan driving control signal SCS may supply a scan signal GW to the pixel unit 110 through the horizontal lines. The scan signal GW may be a signal for applying a data voltage to a gate electrode of a driving transistor included in a pixel PXij at a time point (e.g., a predetermined or selectable time point).

The first initialization driver 150 may receive the first initialization driving control signal ICS1 from the timing controller 140. The first initialization driver 150 receiving the first initialization driving control signal ICS1 may supply a first initialization signal GR to the pixel unit 110 through the horizontal lines. The first initialization signal GR may be a signal for applying a reference voltage to the gate electrode of the driving transistor included in the pixel PXij to initialize the gate electrode of the driving transistor.

The second initialization driver 160 may receive the second initialization driving control signal ICS2 from the timing controller 140. The second initialization driver 160 receiving the second initialization driving control signal ICS2 may supply a second initialization signal GI to the pixel unit 110 through the horizontal lines. The second initialization signal GI may be a signal for applying an initialization voltage to an anode electrode of a light emitting element included in the pixel PXij to initialize the anode electrode of the light emitting element.

The compensation driver 170 may receive the compensation driving control signal CCS from the timing controller 140. The compensation driver 170 receiving the compensation driving control signal CCS may supply a compensation control signal EM1 to the pixel unit 110 through the horizontal lines. In an embodiment, the compensation driving control signal CCS may be a signal for compensating a threshold voltage of the driving transistor included in the pixel PXij.

The emission driver 180 may receive the emission driving control signal ECS from the timing controller 140. The emission driver 180 receiving the emission driving control signal ECS may supply an emission control signal EM2 to the pixel unit 110 through the horizontal lines. In an embodiment, the emission control signal EM2 may be a signal for controlling light emitting from the light emitting element included in the pixel PXij.

For example, each of the drivers may sequentially supply a driving control signal to the horizontal lines. For example, the scan driver 120 may sequentially supply a scan signal GW among n scan signals GW1 to GWn to a corresponding line (e.g., a horizontal line) among n horizontal lines. In case that the scan signal GW is sequentially supplied, the pixels PXij may be selected in units of horizontal lines. To this end, the scan signal GW may be set to a gate-on voltage (for example, a logic high level) so that the transistors included in the pixels PXij may be turned on.

A method of sequentially supplying a driving control signal to the horizontal lines by other drivers and the scan driver 120 may be the same, and a description thereof will be omitted.

In FIG. 1, the scan driver 120, the first and second initialization drivers 150 and 160, the compensation driver 170, and the emission driver 180 are shown as being located (or disposed) on both sides of the pixel unit 110. However, locations of the drivers are not limited thereto. For example, the compensation driver 170 and the emission driver 180 may be located (or disposed) below the pixel unit 110.

In an embodiment, an image displayed from the display device 100 may include multiple emission cycles within one frame period.

Figure 2:
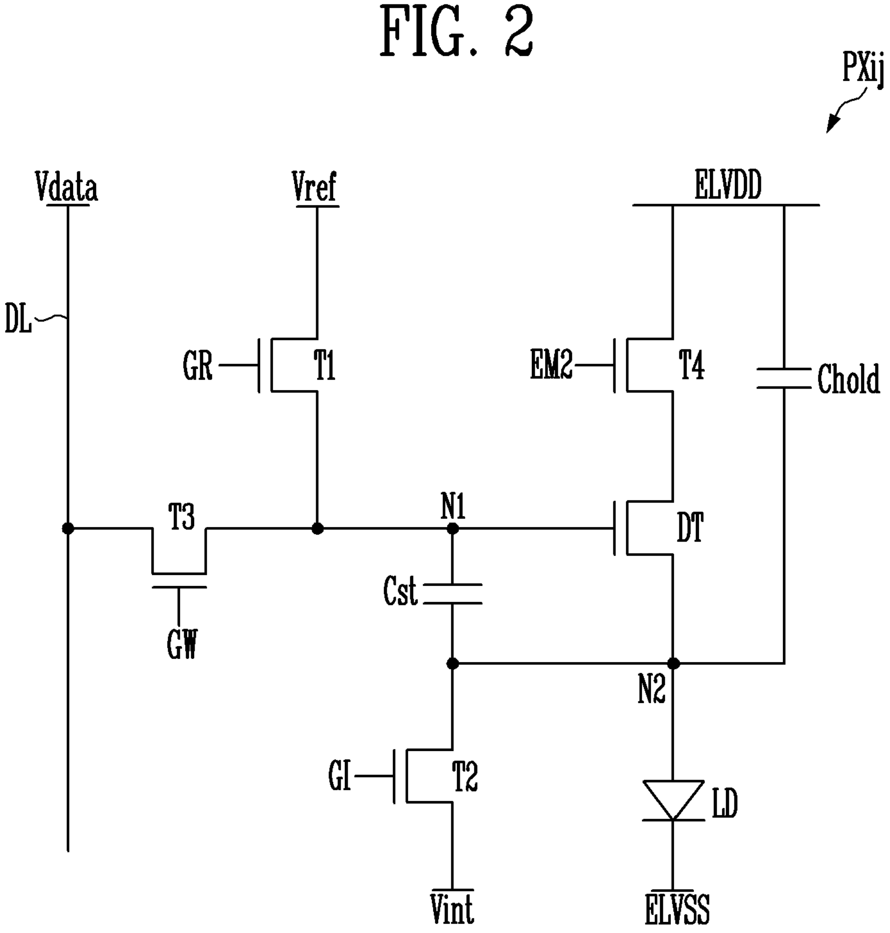
FIG. 2 is a schematic diagram of an equivalent circuit of a pixel of FIG. 1.

FIG. 2 is a schematic diagram of an equivalent circuit of a pixel of FIG. 1.

Referring to FIG. 2, for convenience of description, a pixel PXij positioned on and connected to an i-th horizontal line (or i-th pixel row) and a j-th data line DLj (or DL) is shown, where i and j may be natural numbers.

Referring to FIG. 2, the pixel PXij may include a light emitting element LD, a driving transistor DT, first to fourth transistors T1 to T4, a storage capacitor Cst, and a hold capacitor Chold.

The driving transistor DT may be connected between a terminal of a first power source ELVDD and the light emitting element LD (or a second node N2), and may have a gate electrode connected to a first node N1. The driving transistor DT may control an amount of current flowing from the first power source ELVDD to a second power source ELVSS through the light emitting element LD in response to a voltage of the first node N1. In an embodiment, the voltage level of the first power source ELVDD may be higher than the voltage level of the second power source ELVSS.

The light emitting element LD may be connected between the second node N2 and a terminal of the second power source ELVSS. For example, an anode electrode of the light emitting element LD may be connected to the second node N2, and a cathode electrode of the light emitting element LD may be connected to the terminal of the second power source ELVSS. The light emitting element LD may generate light with a luminance in response to the amount of current (driving current) supplied from the driving transistor DT. In an embodiment, the light emitting element LD may be an organic light emitting diode including an organic light emitting layer. In another embodiment, the light emitting element LD may be an inorganic light emitting element including an inorganic material. In another embodiment, the light emitting element LD may be a light emitting element composed of a combination of an inorganic material and an organic material. In another embodiment, the light emitting element LD may have a form in which multiple inorganic light emitting elements are connected in parallel and/or in series between the second power source ELVSS and the second node N2.

The first transistor T1 may be connected between a reference power source and the first node N1. A first initialization control signal GR may be applied to a gate electrode of the first transistor T1. In case that the first initialization control signal GR is applied to the gate electrode of the first transistor T1, the first transistor T1 may be turned on, and a reference voltage Vref may be applied to the gate electrode of the driving transistor DT.

The second transistor T2 may be connected between an initialization power source and the second node N2. A second initialization control signal GI may be provided to a gate electrode of the second transistor T2. In case that the second initialization control signal GI is provided to the gate electrode of the second transistor T2, the second transistor T2 may be turned on, and an initialization voltage Vint may be applied to the anode electrode of the light emitting element LD.

The third transistor T3 may be connected between a data line DL and the first node N1. The scan signal GW may be provided to a gate electrode of the third transistor T3. In case that the scan signal GW is provided to the gate electrode of the third transistor T3, the third transistor T3 may be turned on, and a data voltage Vdata may be applied to the gate electrode of the driving transistor DT.

The fourth transistor T4 may be connected between the terminal of the first power source ELVDD and the driving transistor DT. The emission control signal EM2 may be provided to a gate electrode of the fourth transistor T4. The fourth transistor T4 may be an emission control transistor. For example, in case that the emission control signal EM2 is provided to the gate electrode of the fourth transistor T4, the fourth transistor T4 may be turned on, and the driving current may flow from the first power source ELVDD to the light emitting element LD through the driving transistor DT. The light emitting element LD may emit light based on the driving current flowing through the light emitting element LD. An emission period of the light emitting element LD may be determined corresponding to a turn-on period of the fourth transistor T4.

The storage capacitor Cst may be connected between the first node N1 and the second node N2. The storage capacitor Cst may store a voltage corresponding to a voltage difference between the gate electrode of the driving transistor DT and a source electrode of the driving transistor DT.

The hold capacitor Chold may be connected between the terminal of the first power source ELVDD and the second node N2. The hold capacitor Chold may stabilize a voltage of the second node N2.

Figure 3A:
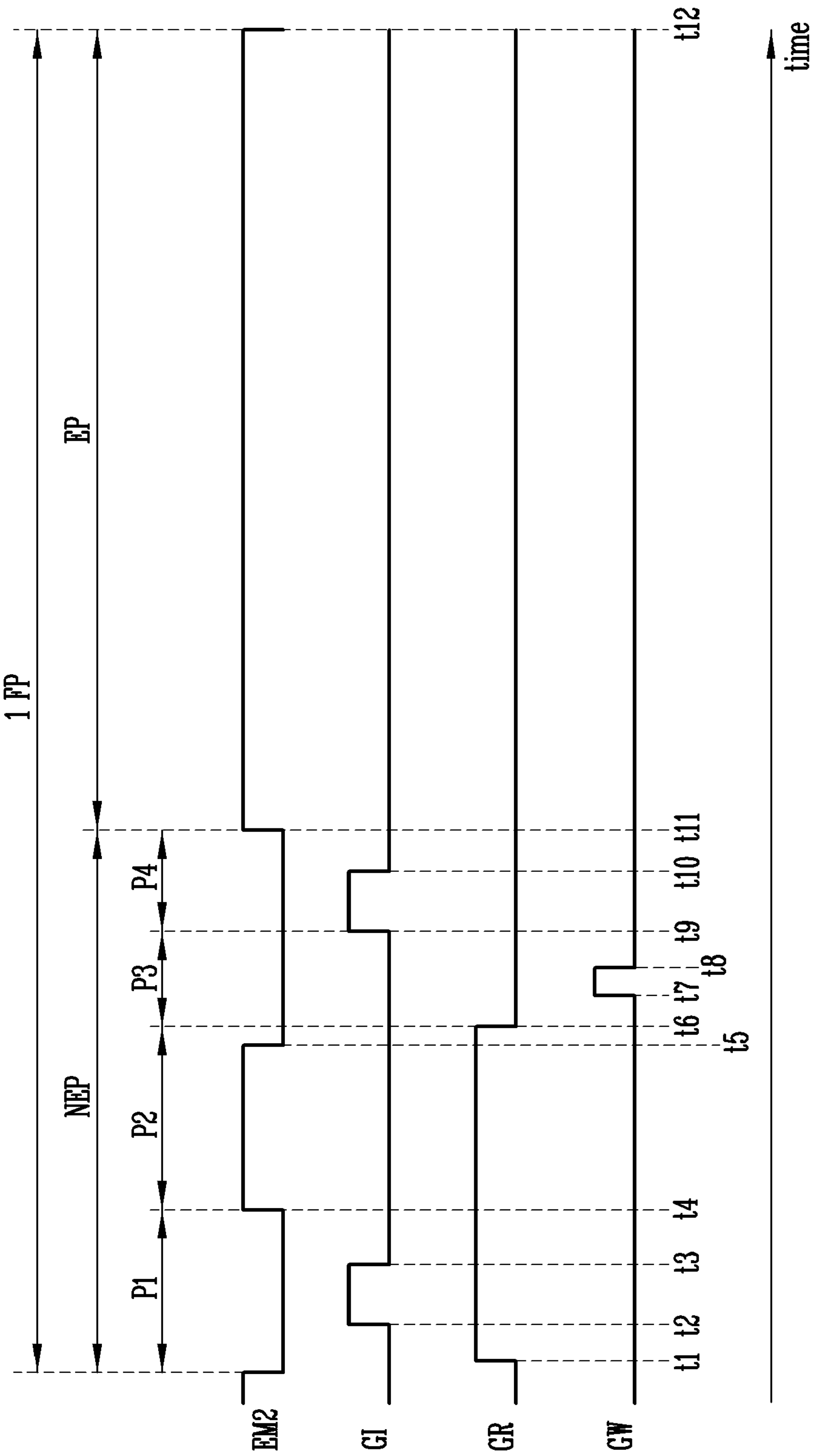
FIG. 3A is a schematic graph illustrating an operation of the pixel of FIG. 2.
Figure 3B:
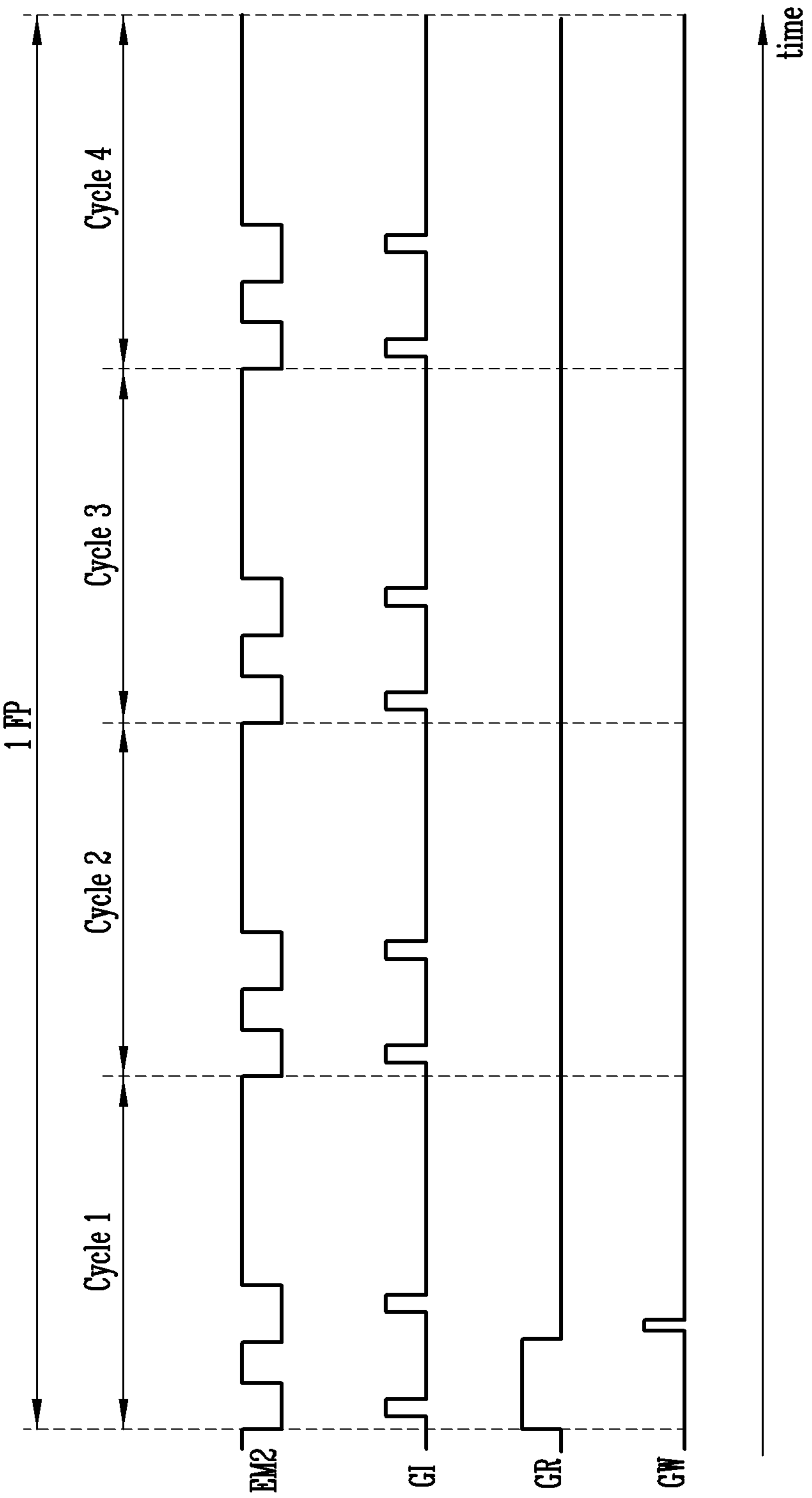
FIG. 3B is a schematic graph illustrating an operation of the pixel of FIG. 2.

FIGS. 3A and 3B are schematic graphs illustrating an operation of the pixel of FIG. 2.

Referring to FIG. 3A, in case that the display device displays an image, one frame period 1FP corresponding to one image frame may include a non-emission period NEP and an emission period EP. The non-emission period NEP may include a first initialization period P1, a compensation period P2, a data writing period P3, and a second initialization period P4.

Referring to FIG. 3A, in an embodiment, in the first initialization period P1, the gate electrode of the driving transistor DT and the anode electrode of the light emitting element LD may be initialized. At a time point t1, the first transistor T1 may be turned on as the first initialization control signal GR is provided to the gate electrode of the first transistor T1. As the first transistor T1 is turned on, the reference voltage Vref may be applied from the reference power source to the gate electrode of the driving transistor DT. At a time point t2, the second transistor T2 may be turned on as the second initialization control signal GI is provided to the gate electrode of the second transistor T2. As the second transistor T2 is turned on, the initialization voltage Vint may be applied from the initialization power source to the anode electrode of the light emitting element LD. At a time point t3, the second transistor T2 may be turned off.

In the compensation period P2, a threshold voltage Vth of the driving transistor DT may be compensated. At a time point t4, the fourth transistor T4 may be turned on as the emission control signal EM2 is provided to the gate electrode of the fourth transistor T4. As the fourth transistor T4 is turned on, a current may flow from the first power source ELVDD to the second node N2 through the driving transistor DT. A voltage Vref−Vth corresponding to a difference between the reference voltage Vref applied to the gate electrode of the driving transistor DT and the threshold voltage Vth of the driving transistor DT may be applied to the second node N2 by source follow. At a time point t5, the fourth transistor T4 may be turned off, and at a time point t6, the first transistor T1 may be turned off.

In the data writing period P3, the data voltage Vdata may be applied to the gate electrode of the driving transistor DT. At a time point t7, the third transistor T3 may be turned on as the scan signal GW is provided to the gate electrode of the third transistor. As the third transistor T3 is turned on, the data voltage Vdata may be applied to the gate electrode of the driving transistor DT. A phenomenon in which the data voltage Vdata applied to the first node N1 affects the voltage of the second node N2 may be minimized by the hold capacitor Chold connected between the terminal of the first power source ELVDD and the second node N2. The third transistor T3 may be turned off at a time point t8.

In the second initialization period P4, the anode electrode of the light emitting element LD may be initialized. At a time point t9, the second transistor T2 may be turned on as the second initialization signal GI is provided to the gate electrode of the second transistor T2. As the second transistor T2 is turned on, the initialization voltage Vint may be applied to the anode electrode of the light emitting element LD. In an embodiment, the second initialization period P4 may be omitted.

During the emission period EP, the light emitting element LD may emit light under the control of the fourth transistor T4. At a time point t11, the fourth transistor T4 may be turned on as the emission control signal EM2 is provided to the gate electrode of the fourth transistor T4. As the fourth transistor T4 is turned on, the driving current may flow from the first power source ELVDD to the light emitting element LD through the driving transistor DT. Accordingly, the light emitting element LD may emit light. The fourth transistor T4 may be turned off at a time point t12.

In case that the frame driving shown in FIG. 3A is repeated, a relatively long non-emission period NEP may be included within one frame period 1FP, and flicker may be visually recognized by a user. To reduce the flicker, as shown in FIG. 3B, control signals EM2, GI, GR, and GW may be provided to the pixel PXij so that multiple emission cycles Cycle1, Cycle2, Cycle3, and Cycle4 are included in one frame period 1FP. The emission cycles Cycle1, Cycle2, Cycle3, and Cycle4 may include a first emission cycle Cycle1, a second emission cycle Cycle2, a third emission cycle Cycle3, and a fourth emission cycle Cycle4.

Referring to FIG. 3B, one frame period 1FP may include the emission cycles Cycle1, Cycle2, Cycle3, and Cycle4, and each of the emission cycles Cycle1, Cycle2, Cycle3, and Cycle4 may include an emission period (see, e.g., EP of FIG. 3A) in which a light emitting element LD included in a pixel PXij emits light and a non-emission period (see, e.g., NEP of FIG. 3A) in which a light emitting element LD included in a pixel PXij does not emit light. In second to fourth emission cycles Cycle2, Cycle3, and Cycle4, the light emitting element LD may emit light in case that the emission control signal EM2 is at a high level and may not emit light in case that the emission control signal EM2 is at a low level.

In an embodiment, in the first emission cycle Cycle1, initialization of the gate electrode of the driving transistor DT and the anode electrode of the light emitting element LD, threshold voltage Vth compensation of the driving transistor DT, and data writing may be performed. In the second to fourth emission cycles Cycle2, Cycle3, and Cycle4, initialization of the gate electrode of the driving transistor DT and data writing may not be performed. Within one frame period 1FP, the emission cycles Cycle1, Cycle2, Cycle3, and Cycle4 may have a same length.

As described above, since non-emission periods NEP are periodically repeated within one frame period 1FP, a luminance difference between frames is reduced, thereby reducing the flicker.

FIG. 3B shows an embodiment in which one frame period 1FP has four emission cycles Cycle1, Cycle2, Cycle3, and Cycle4, but the disclosure is not limited thereto. For example, one frame period 1FP may include two or eight emission cycles, depending on design and/or conditions.

Figure 4A:
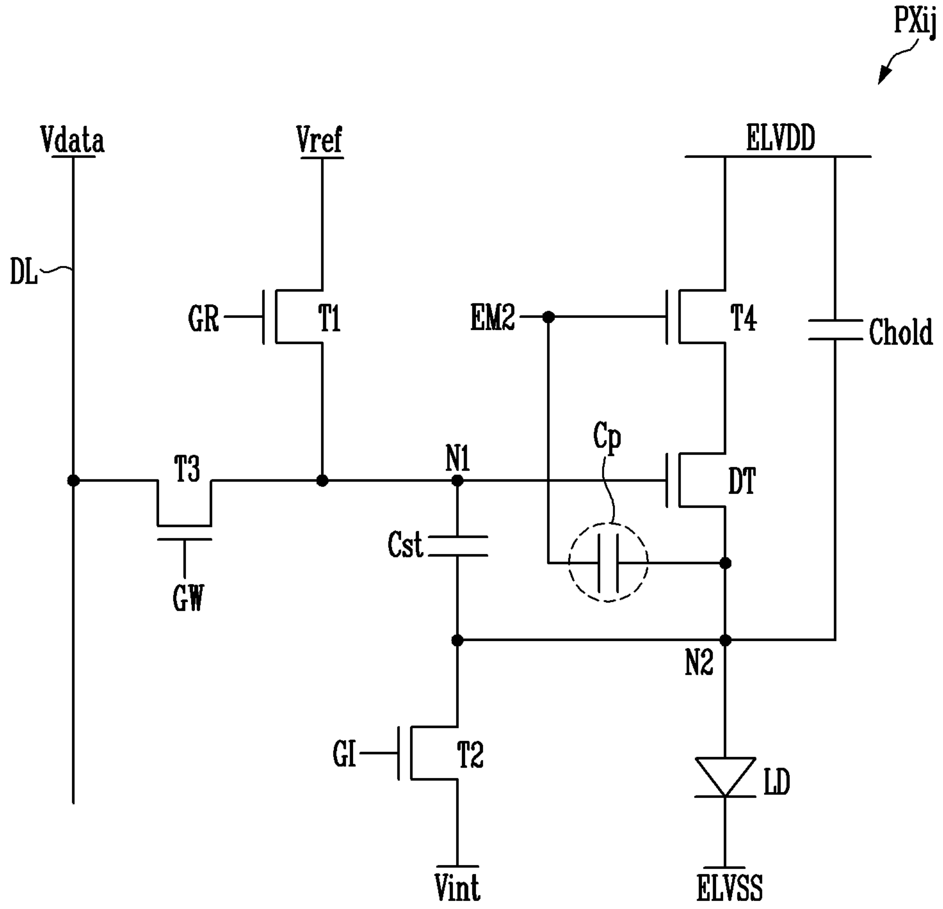
FIG. 4A is a schematic diagram of an equivalent circuit of a pixel illustrating a voltage drop at a source node of a driving transistor due to kick-back.
Figure 4B:
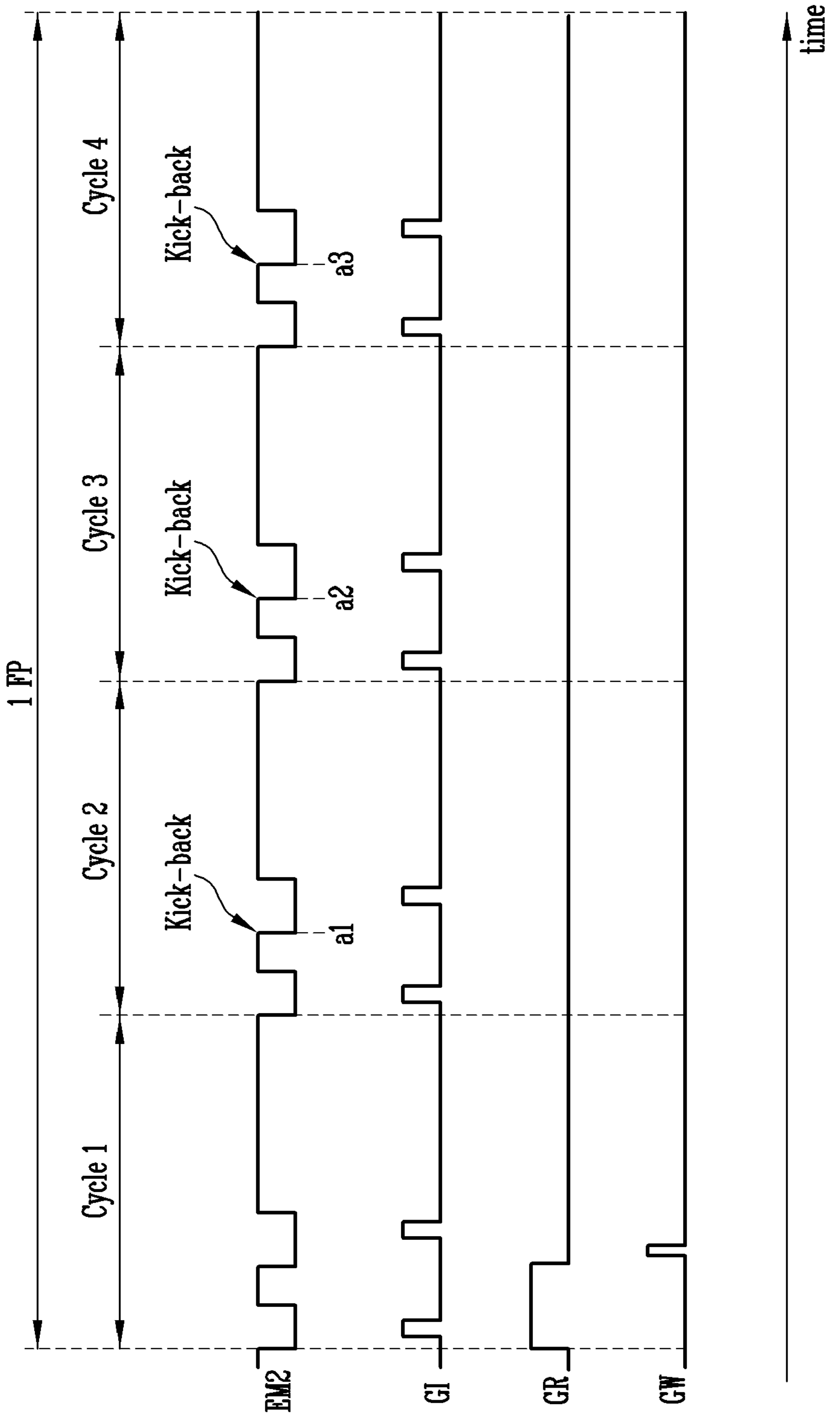
FIG. 4B is a schematic graph illustrating a voltage drop at a source node of a driving transistor due to kick-back.

FIG. 4A is a schematic diagram of an equivalent circuit of a pixel illustrating a voltage drop at a source node of a driving transistor due to kick-back. FIG. 4B is a schematic graph illustrating a voltage drop at a source node of a driving transistor due to kick-back.

Referring to FIG. 4A, the pixel PXij may include a parasitic capacitor Cp between the second node N2 and the gate electrode of the fourth transistor T4 to which the emission control signal EM2 is provided. The second node N2 and a source node of the driving transistor DT may be the same. As the emission control signal EM2 transitions from a high level to a low level, the voltage of the second node N2 may drop due to kick-back. A degree to which the voltage of the second node N2 decreases due to kick-back may vary depending on the position of the pixel PXij in a display panel. For example, as the position of the pixel PXij in the display panel is farther from a stage circuit (for example, the compensation driver 170 or the emission driver 180 of FIG. 1) from which the emission control signal EM2 is provided, a voltage drop at the second node N2 due to kick-back may increase due to a resistance-capacitance delay (RC delay).

Referring to FIG. 4B, in the second to fourth emission cycles Cycle2, Cycle3, and Cycle4 among the emission cycles Cycle1, Cycle2, Cycle3, and Cycle4 included in one frame period 1FP, the voltage drop at the second node N2 due to kick-back Kick-back may occur. In the compensation period included in each of the second to fourth emission cycles Cycle2, Cycle3, and Cycle4, the voltage drop at the second node N2 due to kick-back Kick-back may occur at time points a1, a2, and a3 at which the emission control signal EM2 falls to the low level.

The pixel unit 110 of FIG. 1 may include multiple pixel rows (e.g., i pixel rows, where i may be a natural number) including multiple pixels PXij, and the emission control signal EM2 may be sequentially provided to the pixel rows in a compensation operation. The degree of voltage drop at the second node N2 due to kick-back may be different for each of the pixels PXij included in one pixel row. Accordingly, unintended stains such as mura may be visually recognized from the display panel.

Figure 5:
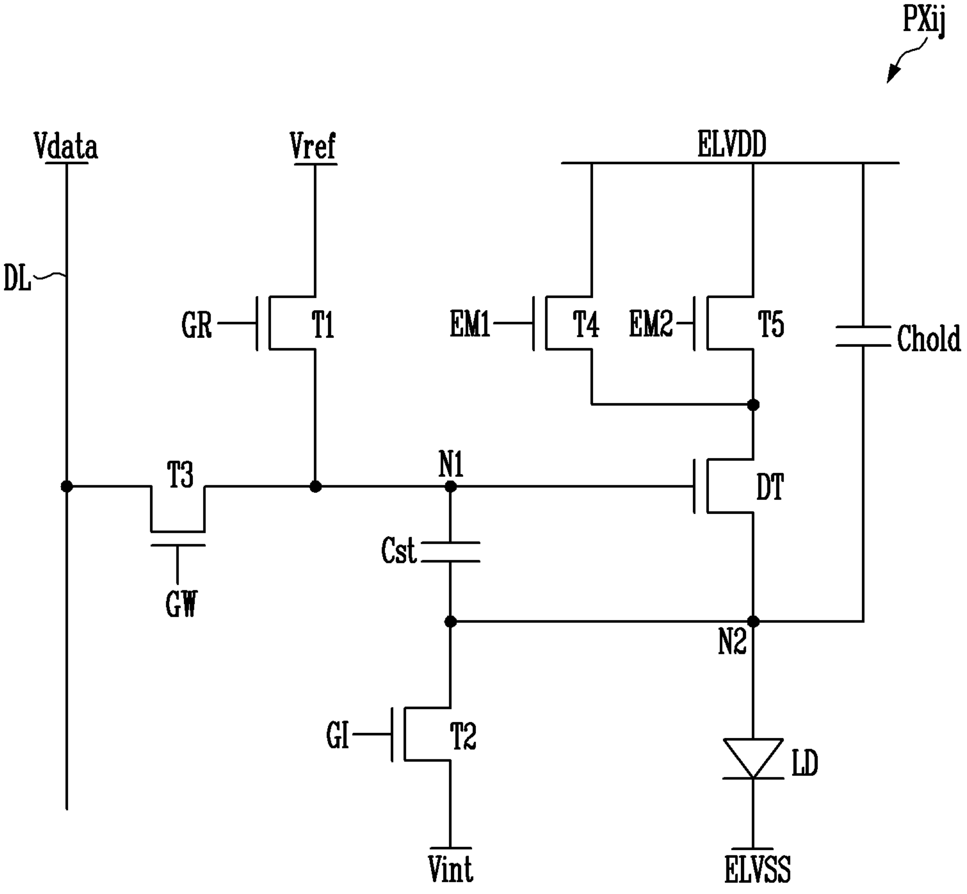
FIG. 5 is a schematic diagram of an equivalent circuit of a pixel according to an embodiment.

FIG. 5 is a schematic diagram of an equivalent circuit of a pixel according to an embodiment.

Referring to FIGS. 1 and 5, the pixel PXij may include a fourth transistor T4 and a fifth transistor T5 connected between the terminal of the first power source ELVDD and the driving transistor DT. The compensation control signal EM1 may be provided to a gate electrode of the fourth transistor T4 from the compensation driver 170. The emission control signal EM2 may be provided to a gate electrode of the fifth transistor T5 from the emission driver 180.

The fourth transistor T4 may be a transistor for controlling a compensation operation for compensating the threshold voltage Vth of the driving transistor DT. In the compensation period, in case that the compensation control signal EM1 is provided to the gate electrode of the fourth transistor T4, the fourth transistor T4 may be turned on. Accordingly, a voltage corresponding to the threshold voltage Vth of the driving transistor DT may be applied to the storage capacitor Cst.

The fifth transistor T5 may be a transistor for controlling a light emitting operation of the light emitting element LD. In the emission period (see, e.g., EP of FIG. 6A), in case that the emission control signal EM2 is provided to the gate electrode of the fifth transistor T5, the fifth transistor T5 may be turned on, and the driving current may flow from the first power source ELVDD to the light emitting element LD through the driving transistor DT. The light emitting element LD may emit light based on the driving current flowing through the light emitting element LD. The emission period of the light emitting element LD may be determined corresponding to a turn-on period of the fifth transistor T5.

Figure 6A:
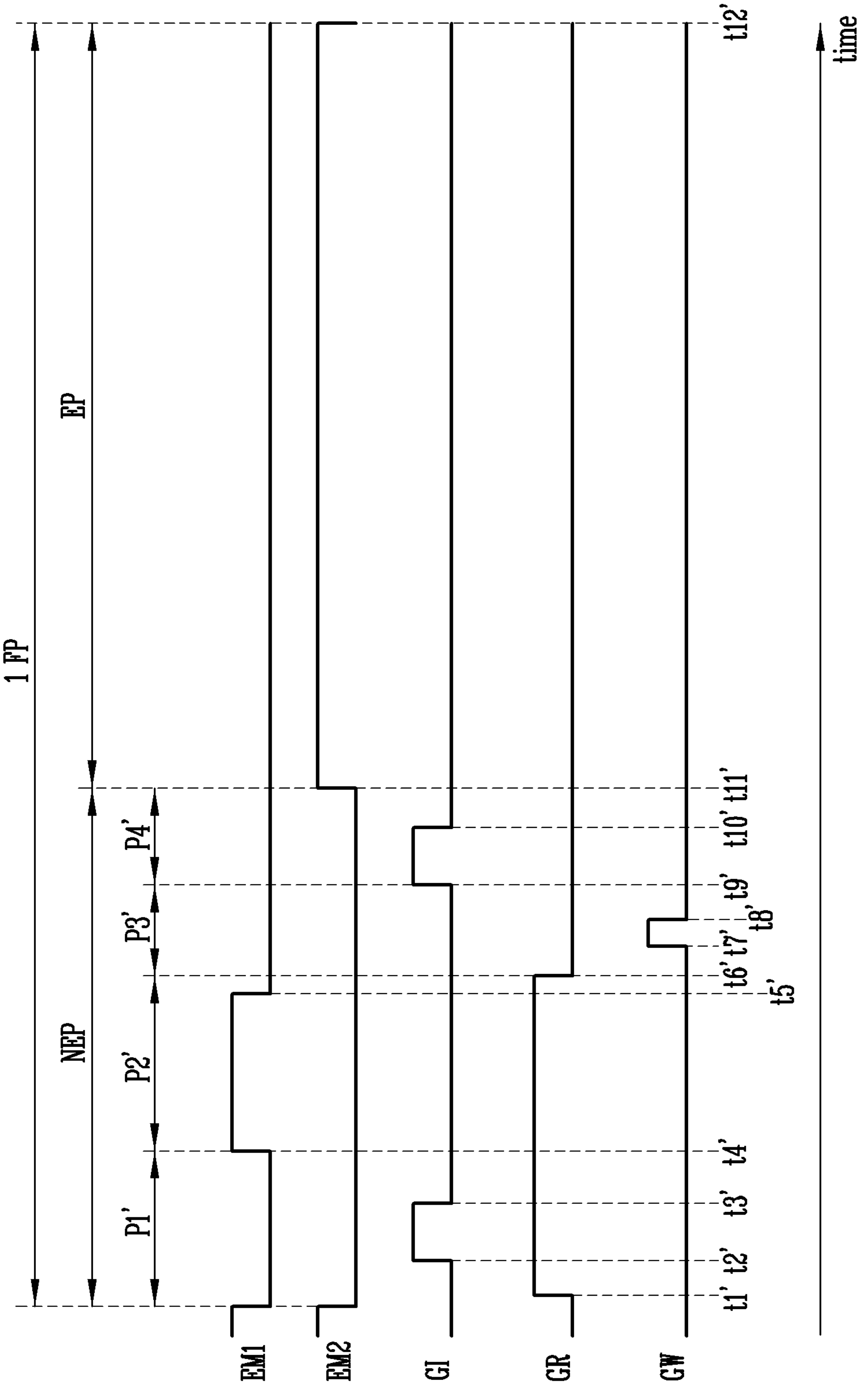
FIG. 6A is a schematic graph illustrating an operation of a pixel according to an embodiment.
Figure 6B:
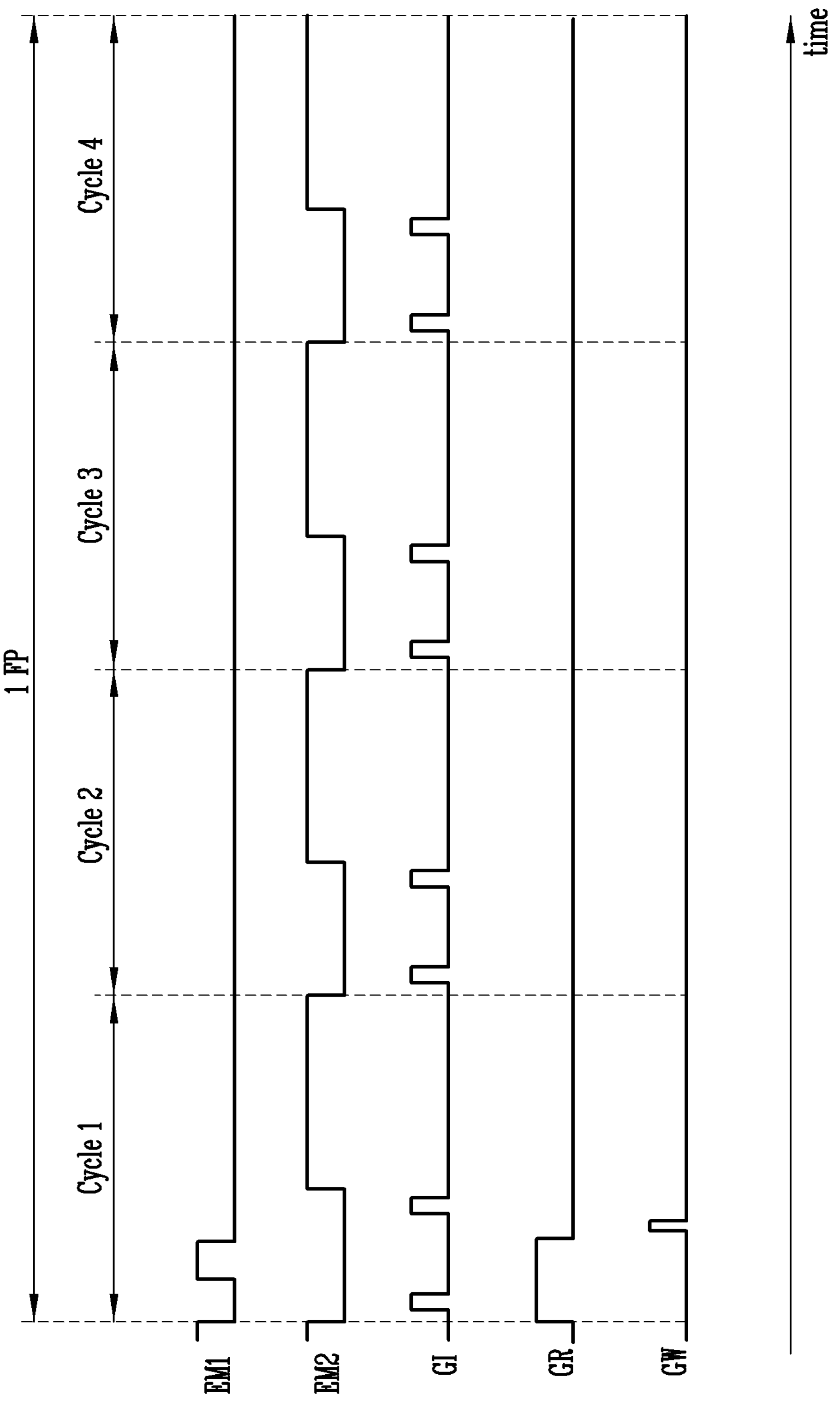
FIG. 6B is a schematic graph illustrating an operation of a pixel according to an embodiment.

FIGS. 6A and 6B are schematic graphs illustrating an operation of a pixel according to an embodiment.

Referring to FIG. 6A, one frame period 1FP corresponding to one image frame may include a non-emission period NEP and an emission period EP. The non-emission period NEP may include a first initialization period P1', a compensation period P2', a data writing period P3', and a second initialization period P4'.

In an embodiment, in the first initialization period P1', the gate electrode of the driving transistor DT and the anode electrode of the light emitting element LD may be initialized. At a time point t1', the first transistor T1 may be turned on as the first initialization control signal GR is provided to the gate electrode of the first transistor T1. As the first transistor T1 is turned on, the reference voltage Vref may be applied from the reference power source to the gate electrode of the driving transistor DT. At a time point t2', the second transistor T2 may be turned on as the second initialization control signal GI is provided to the gate electrode of the second transistor T2. As the second transistor T2 is turned on, the initialization voltage Vint may be applied from the initialization power source to the anode electrode of the light emitting element LD. At a time point t3', the second transistor T2 may be turned off.

In the compensation period P2', the threshold voltage Vth of the driving transistor DT may be compensated. At a time point t4', the fourth transistor T4 may be turned on as the compensation control signal EM1 is provided to the gate electrode of the fourth transistor T4. As the fourth transistor T4 is turned on, a voltage Vref-Vth corresponding to a difference between the reference voltage Vref applied to the gate electrode of the driving transistor DT and the threshold voltage Vth of the driving transistor DT may be applied to the second node N2 by the source follow. At a time point t5', the fourth transistor T4 may be turned off, and at a time point t6, the first transistor T1 may be turned off.

In the data writing period P3', the data voltage Vdata may be applied to the gate electrode of the driving transistor DT. At a time point t7', the third transistor T3 may be turned on as the scan signal GW is provided to the gate electrode of the third transistor T3. As the third transistor T3 is turned on, the data voltage Vdata may be applied to the gate electrode of the driving transistor DT. A phenomenon in which the data voltage Vdata applied to the first node N1 affects the voltage of the second node N2 may be minimized by the hold capacitor Chold connected between the terminal of the first power source ELVDD and the second node N2. The third transistor T3 may be turned off at a time point t8'.

In the second initialization period P4', the anode electrode of the light emitting element LD may be initialized. At a time point t9', the second transistor T2 may be turned on as the second initialization signal GI is provided to the gate electrode of the second transistor T2. As the second transistor T2 is turned on, the initialization voltage Vint may be applied to the anode electrode of the light emitting element LD. In an embodiment, the second initialization period P2' may be omitted.

During the emission period EP, the light emitting element LD may emit light under the control of the fifth transistor T5. At a time point t11', the fifth transistor T5 may be turned on as the emission control signal EM2 is provided to the gate electrode of the fifth transistor T5. As the fifth transistor T5 is turned on, the driving current may flow from the first power source ELVDD to the light emitting element LD through the driving transistor DT. Accordingly, the light emitting element LD may emit light. The fifth transistor T5 may be turned off at a time point t12'.

Unlike the description with reference to FIGS. 2 and 3A, in the pixel PXij shown in FIG. 5, an operation of compensating the threshold voltage Vth of the driving transistor DT and an operation of emitting light from the light emitting element LD may be controlled by different transistors. For example, the operation of compensating the threshold voltage Vth of the driving transistor DT may be controlled by applying the compensation control signal EM1 to the fourth transistor T4 in the compensation period P2'. For example, the operation of emitting light from the light emitting element LD may be controlled by applying the emission control signal EM2 to the fifth transistor T5 in the emission period EP.

Referring to FIG. 6B, one frame period 1FP may include multiple emission cycles Cycle1, Cycle2, Cycle3, and Cycle4, and each of the emission cycles Cycle1, Cycle2, Cycle3, and Cycle4 may include an emission period (see, e.g., EP of FIG. 6A) in which a light emitting element LD included in a pixel PXij emits light and a non-emission period (see, e.g., NEP of FIG. 6A) in which a light emitting element LP included in a pixel PXij does not emit light. In second to fourth emission cycles Cycle2, Cycle3, and Cycle4, the light emitting element LD may emit light in case that the emission control signal EM2 is at a high level and may not emit light in case that the emission control signal EM2 is at a low level.

In an embodiment, in a first emission cycle Cycle1, initialization of the gate electrode of the driving transistor DT and the anode electrode of the light emitting element LD, threshold voltage Vth compensation of the driving transistor DT, data writing, and light emitting from the light emitting element LD may be performed. In the second to fourth emission cycles Cycle2, Cycle3, and Cycle4, initialization of the gate electrode of the driving transistor DT, threshold voltage Vth compensation of the driving transistor DT, and data writing may not be performed. For example, in one frame period 1FP, only the initialization of the anode electrode of the light emitting element LD and the light emitting from the light emitting element LD may be performed in the emission cycles Cycle2, Cycle3, and Cycle4 other than the first emission cycle Cycle1.

Unlike the pixel PXij shown in FIG. 2, in the pixel PXij shown in FIG. 5, an operation of compensating the threshold voltage Vth of the driving transistor DT and an operation of emitting light from the light emitting element LD may be independently performed by compensation control signal EM1 and emission control signal EM2 output from separate emission drivers (see, e.g., the compensation driver 170 and the emission driver 180 of FIG. 1) to gate electrodes of the fourth and fifth transistors T4 and T5. Accordingly, the operation of compensating the threshold voltage Vth of the driving transistor DT may be performed only in the first emission cycle Cycle1 among the emission cycles Cycle1, Cycle2, Cycle3, and Cycle4.

In case that the operation of compensating the threshold voltage Vth is performed only in the first emission cycle Cycle1, the voltage drop at the second node N2 due to kick-back Kick-back as described with reference to FIG. 4B may not occur in the emission cycles Cycle2, Cycle3, and Cycle4 other than the first emission cycle Cycle1. Therefore, a phenomenon in which stains, such as mura, are visually recognized due to a deviation of voltage drop between second nodes N2 of the pixels PXij, which may occur due to kick-back Kick-back, may be improved.

In the pixel PXij of the display device according to the embodiment of the disclosure, an operation of compensating a threshold voltage Vth and an operation of emitting light from a light emitting element LD may be controlled by different transistors included in the pixel PXij. Accordingly, a mura phenomenon that may occur in a display panel due to kick-back of an emission control signal provided to the pixel PXij in the operation of compensating the threshold voltage Vth may be improved.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A pixel comprising:

a light emitting element;

a driving transistor having an electrode electrically connected to an anode electrode of the light emitting element and another electrode electrically connected to a first power source and controlling a current flowing from the first power source to a second power source through the light emitting element;

a first transistor electrically connected between a gate electrode of the driving transistor and a reference power source;

a second transistor electrically connected between the anode electrode of the light emitting element and an initialization power source;

a third transistor electrically connected between the gate electrode of the driving transistor and a data line; and a fourth transistor and a fifth transistor electrically connected in parallel between the first power source and the another electrode of the driving transistor, wherein the fourth transistor compensates a threshold voltage of the driving transistor by electrically connecting the another electrode of the driving transistor to the first power source during a compensation period, and the fifth transistor is turned so that the current flowing through the light emitting element is controlled according to a control of the driving transistor during an emission period of the light emitting element.

2. The pixel of claim 1, further comprising:

a first capacitor electrically connected between the gate electrode of the driving transistor and the anode electrode of the light emitting element; and a second capacitor electrically connected between the first power source and the anode electrode of the light emitting element.

3. The pixel of claim 2, wherein the first transistor is turned on in a first initialization period to initialize the gate electrode of the driving transistor, the second transistor is turned on in the first initialization period to initialize the anode electrode of the light emitting element, and the third transistor is turned on during a data writing period to apply a data voltage to the gate electrode of the driving transistor.

4. The pixel of claim 3, wherein the second transistor is turned on during a second initialization period between the data writing period and the emission period to initialize the anode electrode of the light emitting element.

5. The pixel of claim 3, wherein the light emitting element repeats the emission period and a non-emission period other than the emission period in each of a plurality of emission cycles included in one frame period, each of the plurality of emission cycles includes the emission period, the fifth transistor is turned on in the emission period included in each of the plurality of emission cycles, and the fourth transistor is turned on in a first emission cycle among the plurality of emission cycles and turned off in ones of the plurality of emission cycles other than the first emission cycle.

6. The pixel of claim 3, wherein the light emitting element repeats the emission period and a non-emission period other than the emission period in each of a plurality of emission cycles included in one frame period, each of the plurality of emission cycles includes the emission period, and the first transistor and the third transistor are turned off in each one of the plurality of emission cycles other than a first emission cycle.

7. A display device comprising:

a pixel;

a compensation driver compensating a threshold voltage of a driving transistor included in the pixel by providing a compensation control signal to the pixel; and an emission driver controlling an operation of emitting light from a light emitting element included in the pixel by providing an emission control signal to the pixel, wherein the pixel includes:

the driving transistor having an electrode electrically connected to an anode electrode of the light emitting element and another electrode electrically connected to a first power source and controlling a current flowing from the first power source to a second power source through the light emitting element;

a first transistor electrically connected between a gate electrode of the driving transistor and a reference power source;

a second transistor electrically connected between the anode electrode of the light emitting element and an initialization power source;

a third transistor electrically connected between the gate electrode of the driving transistor and a data line; and a fourth transistor and a fifth transistor electrically connected in parallel between the another electrode of the driving transistor and the first power source, the compensation driver provides the compensation control signal to a gate electrode of the fourth transistor among a plurality of emission control transistors in a compensation period, and the emission driver provides the emission control signal to a gate electrode of the fifth transistor among the plurality of emission control transistors in an emission period of the light emitting element.

8. The display device of claim 7, wherein the pixel further includes:

a first capacitor electrically connected between the gate electrode of the driving transistor and the anode electrode of the light emitting element; and a second capacitor electrically connected between the first power source and the anode electrode of the light emitting element.

9. The display device of claim 8, further comprising:

a first initialization driver providing a first initialization signal to the pixel to initialize the gate electrode of the driving transistor;

a second initialization driver providing a second initialization signal to the pixel to initialize the anode electrode of the light emitting element;

a data driver applying a data voltage to the pixel; and a scan driver providing a scan signal to the pixel so that the data voltage is applied to the pixel at a time point, wherein the first initialization driver provides the first initialization signal to a gate electrode of the first transistor in a first initialization period, the second initialization driver provides the second initialization signal to a gate electrode of the second transistor in the first initialization period, and the scan driver provides the scan signal to a gate electrode of the third transistor in a data writing period in which the data voltage is applied to the gate electrode of the driving transistor.

10. The display device of claim 9, wherein the second initialization driver provides the second initialization signal to the gate electrode of the second transistor in a second initialization period between the data writing period and the emission period.

11. The display device of claim 9, wherein the light emitting element repeats the emission period and a non-emission period other than the emission period in each of a plurality of emission cycles included in one frame period, each of the plurality of emission cycles includes the emission period, the emission driver provides the emission control signal to the gate electrode of the fifth transistor in the emission period included in each of the plurality of emission cycles, and the compensation driver provides the compensation control signal to the gate electrode of the fourth transistor in the compensation period included in a first emission cycle among the plurality of emission cycles.

12. The display device of claim 9, wherein the light emitting element repeats the emission period and a non-emission period other than the emission period in each of a plurality of emission cycles included in one frame period, each of the plurality of emission cycles includes the emission period, and the first transistor and the third transistor are turned off in each one of the plurality of emission cycles other than a first emission cycle.

13. A driving method of a display device including a pixel including a light emitting element and a driving transistor having an electrode electrically connected to an anode electrode of the light emitting element and another electrode electrically connected to a first power source and controlling a current flowing from the first power source to a second power source through the light emitting element, comprising:

initializing a gate electrode of the driving transistor;

initializing the anode electrode of the light emitting element;

compensating a threshold voltage of the driving transistor;

applying a data voltage to the gate electrode of the driving transistor; and emitting light from the light emitting element, wherein in the compensating of the threshold voltage of the driving transistor, a compensation control signal is provided to a gate electrode of a fourth transistor among the fourth transistor and a fifth transistor electrically connected in parallel between the another electrode of the driving transistor and the first power source to turn on the fourth transistor, and the threshold voltage of the driving transistor is compensated through the fourth transistor, and in the emitting of light from the light emitting element, an emission control signal is provided to a gate electrode of the fifth transistor to control an operation of emitting light from the light emitting element.

14. The driving method of claim 13, wherein the pixel further includes:

a first transistor electrically connected between the gate electrode of the driving transistor and a reference power source;

a second transistor electrically connected between the anode electrode of the light emitting element and an initialization power source;

a third transistor electrically connected between the gate electrode of the driving transistor and a data line;

a first capacitor electrically connected between the gate electrode of the driving transistor and the anode electrode of the light emitting element; and a second capacitor electrically connected between the first power source and the anode electrode of the light emitting element.

15. The driving method of claim 14, wherein the initializing of the gate electrode of the driving transistor includes providing a first initialization signal to a gate electrode of the first transistor to initialize the gate electrode of the driving transistor, the initializing of the anode electrode of the light emitting element includes providing a second initialization signal to a gate electrode of the second transistor to initialize the anode electrode of the light emitting element, and the applying of the data voltage to the gate electrode of the driving transistor includes applying a scan signal to a gate electrode of the third transistor so that the data voltage is applied to the pixel at a time point.

16. The driving method of claim 15, further comprising:

providing the second initialization signal to the gate electrode of the second transistor after the applying of the data voltage to the gate electrode of the driving transistor and before the emitting of light from the light emitting element.

17. The driving method of claim 15, wherein the light emitting element repeats an emission period and a non-emission period other than the emission period in each of a plurality of emission cycles included in one frame period, each of the plurality of emission cycles includes the emitting of light from the light emitting element, and only a first emission cycle among the plurality of emission cycles includes the compensating of the threshold voltage of the driving transistor.

18. The driving method of claim 17, wherein each one of the plurality of emission cycles other than the first emission cycle does not include:

the initializing of the gate electrode of the driving transistor;

the compensating of the threshold voltage of the driving transistor; and the applying of the data voltage to the gate electrode of the driving transistor.

* * * * *